(12) United States Patent
Wittenbecher et al.

(10) Patent No.: US 11,192,203 B2
(45) Date of Patent: Dec. 7, 2021

(54) SENSOR DEVICE FOR SCANNING LASER PROCESSING OF A WORKPIECE BY MEANS OF A LASER BEAM DEFLECTED ABOUT A PIVOT POINT

(71) Applicant: JENOPTIK Automatisierungstechnik GmbH, Jena (DE)

(72) Inventors: Wolfgang Wittenbecher, Gumperda (DE); Martin Griebel, Jena (DE)

(73) Assignee: JENOPTIK AUTOMATISIERUNGSTECHNIK GMBH, Jena (DE)

( * ) Notice: Subject to any disclaimer, the term of this patent is extended or adjusted under 35 U.S.C. 154(b) by 346 days.

(21) Appl. No.: 16/509,810

(22) Filed: Jul. 12, 2019

(65) Prior Publication Data

US 2020/0016689 A1 Jan. 16, 2020

(30) Foreign Application Priority Data

Jul. 13, 2018 (DE) .................... 10 2018 116 998.1

(51) Int. Cl.
| | |
|---|---|
| *B23K 26/03* | (2006.01) |
| *B23K 26/04* | (2014.01) |
| *B23K 26/06* | (2014.01) |
| *B23K 26/08* | (2014.01) |
| *B23K 26/70* | (2014.01) |

(52) U.S. Cl.
CPC ........... *B23K 26/03* (2013.01); *B23K 26/048* (2013.01); *B23K 26/0665* (2013.01); *B23K 26/0861* (2013.01); *B23K 26/705* (2015.10)

(58) Field of Classification Search
CPC .... B23K 26/03; B23K 26/705; B23K 26/048; B23K 26/0665; B23K 26/0861
See application file for complete search history.

(56) References Cited

U.S. PATENT DOCUMENTS

| | | | |
|---|---|---|---|
| 4,914,284 A | 4/1990 | Halldorsson et al. | |
| 9,383,260 B1 | 7/2016 | Yoo et al. | |
| 2016/0067821 A1 | 3/2016 | Lutze et al. | |
| 2016/0339541 A1* | 11/2016 | Spoerl | G02B 7/102 |

FOREIGN PATENT DOCUMENTS

| | | |
|---|---|---|
| DE | 3736616 C1 | 2/1989 |
| DE | 4322865 A1 | 1/1995 |
| DE | 19949501 A1 | 4/2001 |
| DE | 19950588 A1 | 4/2001 |
| DE | 69802082 T2 | 6/2002 |
| DE | 102014108133 A1 | 12/2015 |
| EP | 0991551 A1 | 4/2000 |
| EP | 2962800 A2 | 1/2016 |

* cited by examiner

*Primary Examiner* — Que Tan Le
*Assistant Examiner* — Don J Williams
(74) *Attorney, Agent, or Firm* — Patentbar International, P.C.

(57) ABSTRACT

The invention relates to a sensor device for scanning laser processing of a workpiece by means of a laser beam deflected about a pivot point, said device comprising a holding device and at least two sensors, wherein the holding device is formed by a matrix- or honeycomb-shaped arrangement of sleeves, consisting of individual sleeves whose sleeve axes intersect at a point of intersection (P) outside the holding device, and the at least two sensors each being arranged in one of the sleeves such that their sensor axis coincides with the sleeve axis. The holding device advantageously is a monolithic component produced in a generative manufacturing process.

11 Claims, 3 Drawing Sheets

SENSOR DEVICE FOR SCANNING LASER PROCESSING OF A WORKPIECE BY MEANS OF A LASER BEAM DEFLECTED ABOUT A PIVOT POINT

RELATED APPLICATIONS

This application claims priority to German Patent Application DE 10 2018 116 998.1, filed Jul. 13, 2018, which is incorporated herein by reference in its entirety.

FIELD OF THE INVENTION

The invention relates to a sensor device comprising an array of sensors by which material is removed along a predetermined breaking line during processing of a workpiece by means of a laser beam scanning the workpiece, said material removal being performed until the sensors detect a part of the laser beam transmitted through the workpiece.

BACKGROUND OF THE INVENTION

The production of predetermined breaking lines in vehicle equipment elements, e.g. for airbag openings in the dashboard, in the door trim or in the steering wheel hub or as breaking points on components protruding into the passenger compartment, such as cup holders, by means of lasers, has long been known. Due to the high requirements on the one hand for them to break open reliably if necessary and on the other hand for an aesthetic appearance of the equipment parts, so that a vehicle occupant should not perceive the predetermined breaking openings with the naked eye, the material removal is sensor-controlled along the predetermined breaking lines circumscribing the predetermined breaking openings. It is also known for other applications, e.g. in the packaging industry, to introduce predetermined breaking lines as separating aids in containers and the like. In order to create a predetermined breaking line by laser material removal, slots or holes which do not extend completely through the workpiece, or so-called microperforation holes which penetrate the workpiece only with a very small hole, are introduced into the workpiece. By means of the sensor monitoring, either a reproducible remaining defined residual wall thickness or small holes with a reproducible diameter can be produced along the predetermined breaking line by using the exceeding of a specified threshold value as a control parameter when detecting radiant energy transmitted through the residual wall or the hole. For this purpose, at least one sensor is arranged on a side of the workpiece opposite the laser (visible side), which sensor detects, during processing, a transmitted part of the processing laser beam if the workpiece only has a specific residual wall thickness or already has a microhole within the predetermined breaking line at the respective processing point. The necessary relative movement for the generation of predetermined breaking lines by means of energy radiation can basically be generated by the laser beam as a tool or by the workpiece, with the movement of the laser beam having proved to be easier to put into practice. Compared to robot-controlled guidance of a laser source above and along the predetermined breaking line, two or three-dimensional scanning of a laser beam along the predetermined breaking line is technically easy to implement and also permits significantly faster processing. However, the arrangement and in particular the alignment of the sensors, which cannot be arranged in an array with the same alignment of their sensor axes, is more difficult here if the laser beam is guided in scanning by deflection of a mirror, since the laser beam strikes the workpiece at a different angle at each processing point along the predetermined breaking line. Assuming that the laser beam is focused on the reverse side of the workpiece when guided along the predetermined breaking line or, in the case of workpieces of greater wall thickness, is potentially refocused to the current ablation depth during ablation, the sensors must be arranged at an equal distance from the visible side and each face in the direction of the scanning laser beam, which means that the sensor axes, which are in each case positioned orthogonally on a radiation-sensitive receiving surface of the sensors, are aligned in the direction of the laser beam, which may be incident directly, when the laser beam is scanned along the predetermined breaking line. In particular with extended workpieces having predetermined breaking lines describing larger predetermined breaking openings, such as an airbag deployment opening in a dashboard, the cost of producing and mounting a sensor device suitable for this purpose, containing the sensors and a holding device in which the sensors are arranged and aligned with respect to one another, is high. If a predetermined breaking line with a changed line layout is to be produced on the same workpiece, a different holding device or at least a design change to the holding device is required.

SUMMARY OF THE INVENTION

It is the object of the invention to provide a sensor device for scanning laser processing of a workpiece, said sensor device comprising a holding device that allows a locally flexible and changeable arrangement of the sensors and is easy to manufacture.

The object is achieved by a sensor device for scanning laser processing of a workpiece by means of a laser beam deflected about a pivot point, said device comprising a holding device and at least two sensors, wherein the holding device is formed by a matrix- or honeycomb-shaped arrangement of firmly interconnected sleeves, consisting of individual sleeves open on at least one side, each having a sleeve axis, the sleeve axes intersecting at a point of intersection outside the holding device, and the at least two sensors, each having a sensor axis, each being arranged in one of the sleeves such that their sensor axis coincides with the sleeve axis.

Advantageous embodiments are set forth in the subclaims.

Particularly advantageously, the holding device is produced as a monolithic component by a generative process, also known as 3D printing. In addition to its speed of the entire manufacturing process with minimal material input, this process offers the advantage that a component can also be manufactured with undercuts, which are difficult to avoid when the interior of the sleeve is designed as a plug-in connection for a sensor. In particular, if a large number of sensors with a high local resolution are to be selectively arranged in the holding device, the design of the holding device, formed by a matrix- or honeycomb-shaped arrangement of sleeves, which can be largely reduced to the size of the sensors and are connected to one another monolithically or by bonding, is very favorable. Such an arrangement of firmly connected sleeves results in high internal stability of the component, even if the sleeve walls are thin. The outer cross-section and the inner cross-section of the sleeves may have different shapes and the sleeve walls may merge into each other. In the broadest sense, the arrangement of the sleeves may also be formed by through holes or blind holes in a plate. The inner contour of the sleeves is advantageously designed such that the sensors are held centered in the sleeve via a plug-in connection, so that the sensor axes of the inserted sensors and the sleeve axes each coincide and intersect at a point of intersection about which the processing laser beam can be deflected during the processing of a workpiece. Due to the low radiation power transmitted through the workpiece during processing, the holding device can be made of a plastic material and is therefore ideally suited to be produced as an injection-molded part or, in particular, by 3D printing. The sensors can be plugged into another sleeve if necessary, e.g. if the layout of the cutting line is changed.

BRIEF DESCRIPTION OF THE DRAWINGS

The invention will be explained in more detail below with reference to exemplary embodiments and with the help of drawings, wherein.

DETAILED DESCRIPTION OF THE PREFERRED EMBODIMENTS

Figure 1:
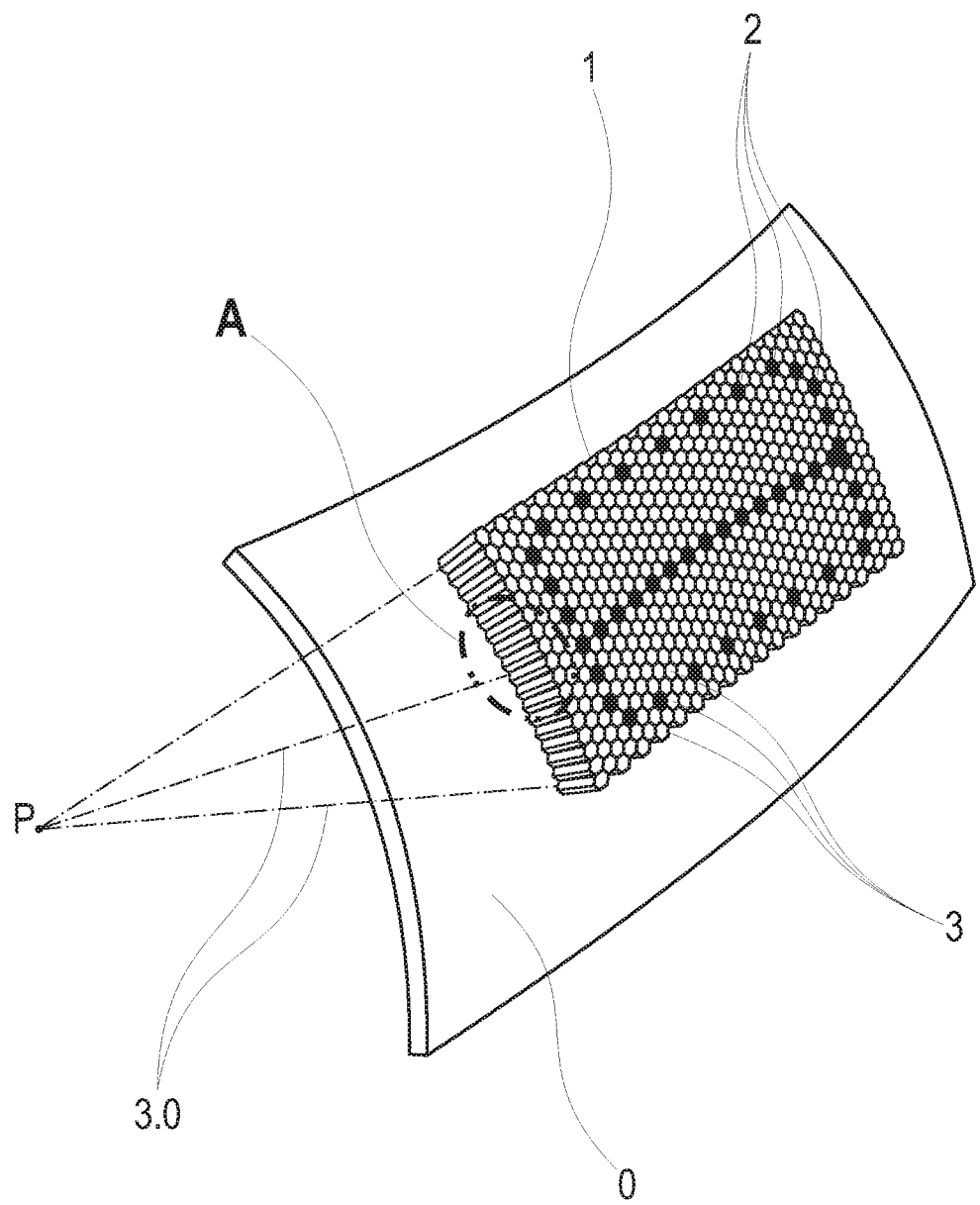
FIG. 1 shows a workpiece to be machined and a sensor device arranged for this purpose.

FIG. 1 shows a sensor device in accordance with the invention for processing a workpiece 0 by means of a scanning laser beam which is deflected about a pivot point, conventionally arranged on a reverse side of the workpiece 0. The laser beam, which can be deflected about a pivot point, is directed onto a front side of the workpiece 0. Depending on the degree of deflection, the laser beam strikes the workpiece 0 at a different angle. In order for a part of the laser beam transmitted through the workpiece 0 to be detected optimally by a sensor 2 arranged downstream of the workpiece 0, the sensor axis 2.0 (not shown in FIG. 1) of the sensor 2, which is positioned orthogonally on the radiation-sensitive receiving surface of the sensor 2, must be directed in the direction of the incident laser beam, i.e. the sensor axes 2.0 must intersect at the pivot point.

Figure 2A:
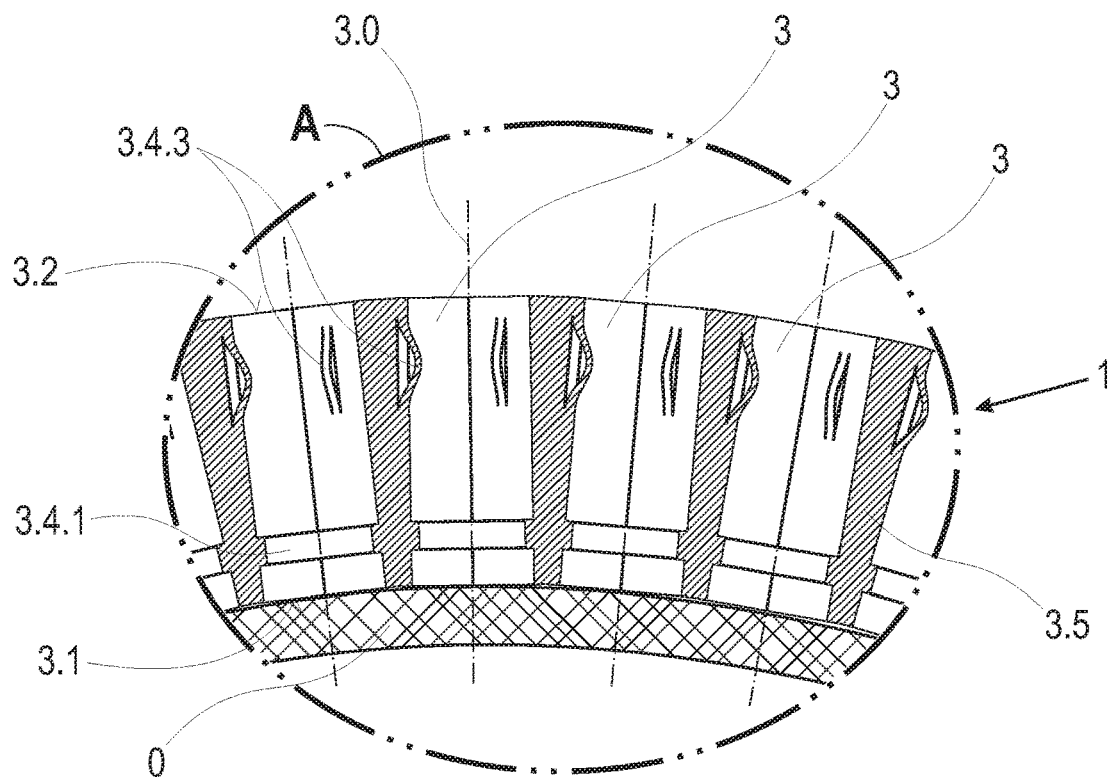
FIG. 2A shows a sectional view of a sensor device contacting the workpiece via a mating surface.
Figure 2B:
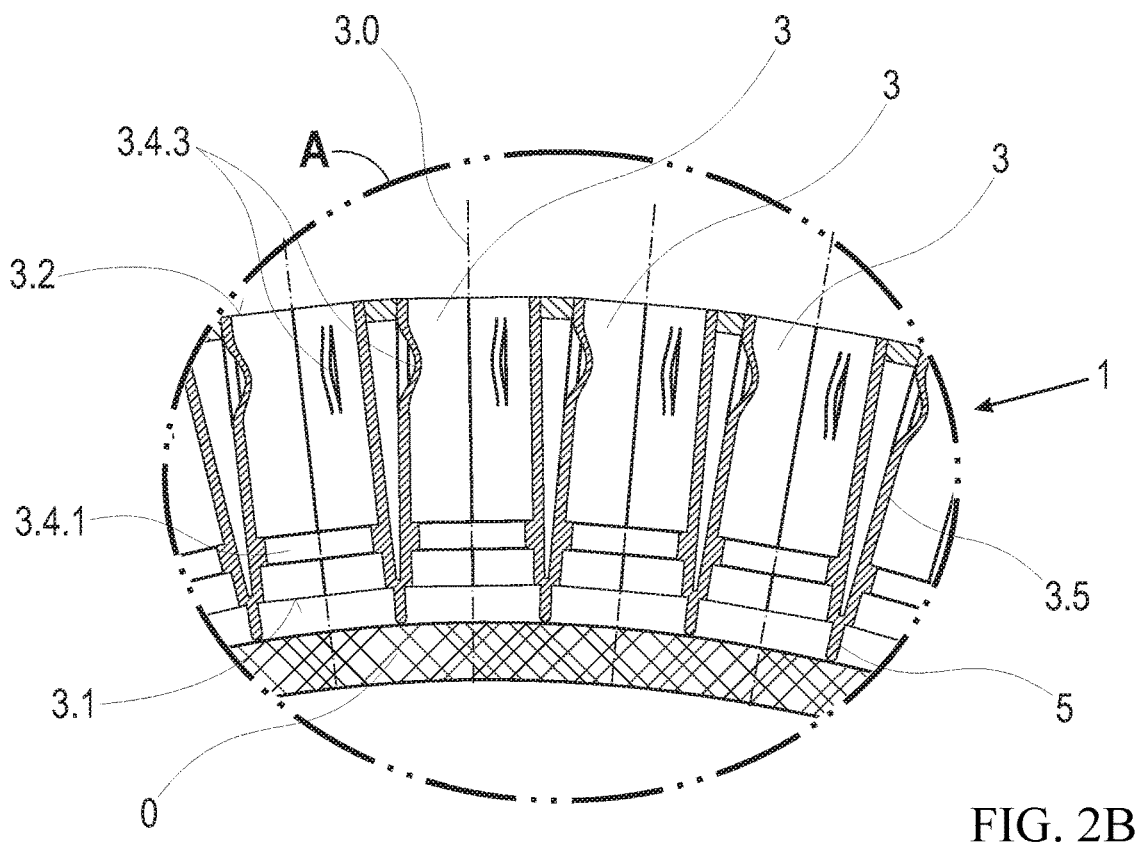
FIG. 2B shows a sectional view of a sensor device contacting the workpiece via spacers.

A sensor device according to the invention basically includes a holding device 1 and at least two sensors 2. The holding device 1 has a matrix arrangement or, as shown in FIG. 1, a honeycomb arrangement of sleeves consisting of individual sleeves 3. As shown in FIGS. 2A and 2B, the sleeves 3 each have a sleeve axis 3.0 and a sleeve wall 3.5 which is bounded by a first end face 3.1 and a second end face 3.2 (see FIG. 3B) or a bottom face 3.3 (see FIG. 3A).

So that the sensors 2 inserted in the sleeves 3 are each aligned in the direction of an incident laser beam, the sleeves 3 are arranged relative to each other in such a way that the sleeve axes 3.0 intersect at a point of intersection P on the side of the first end faces 3.1 outside the holding device 1. During processing, the laser beam is deflected about this point of intersection P, i.e. the sensor device is arranged, with respect to a device scanning the laser beam, in such a way that the point of intersection P coincides with the pivot point about which the laser beam is deflected. The inner contour of the sleeves 3 is designed in such a way that the sensors 2 are held centered within the sleeve 3 when they are inserted into the sleeve 3, so that their sensor axis 2.0 coincides with the sleeve axis 3.0.

Advantageously, the first end faces 3.1 together form a contiguous mating surface which is adapted to the surface contour of the workpiece 0 in a processing area. Here, adapted means that the mating surface has the same surface contour as that of the workpiece 0 in the processing area or has an approximately identical surface structure, the centres of the first end faces 3.1 each lying on an imaginary surface with the same contour as the workpiece 0. As shown in FIG. 2A, the mating surface of the sensor device can thus be applied directly to the surface of the workpiece 0. The sensors 2 arranged in a sleeve 3 in the sensor device each have the same vertical distance to the workpiece 0. In the case of the sleeves 3 shown in FIGS. 2A and 2b, instead of a second collar 3.4.2, e.g. three spring elements 3.4.3 are provided on the sleeve wall 3.5. In principle, any interior design and also any interior contour of the sleeve 3, e.g. polygonal or round, is possible as long as it is suitable to accommodate the sensor 2 in such a way that its sensor axis 2.0 coincides with the sleeve axis 3.0. A sleeve shape in which an outer circumferential line of the cross-section of the sleeve 3 has a hexagonal shape and an inner circumferential line of the cross-section of the sleeve 3 has a circular shape is advantageous, in particular for production in a 3D printing process.

As an alternative to forming a mating surface, some of the first end faces 3.1 have spacers 5 formed thereon against which the workpiece 0 can be applied, as shown in FIG. 2B.

Advantageously, the sensor device has more sleeves 3 than sensors 2, which means that the sensors 2 are arranged to form a selectable pattern. The pattern is determined by the line path of a predetermined breaking line, which is to be introduced into the workpiece 0 and along which the laser beam scans the workpiece 0.

The inner contour of the sleeves 3 is designed to provide a plug-in connection for the sensors 2. Thus a first collar 3.4.1 is advantageously formed in each of the sleeves 3, within or on which collar 3.4.1 one of the sensors 2 is held.

Advantageously, the first and, if necessary, a second collar 3.4.1, 3.4.2 each have a circular inner contour and the sensors 2 have a cylindrical outer contour.

Figure 3A:
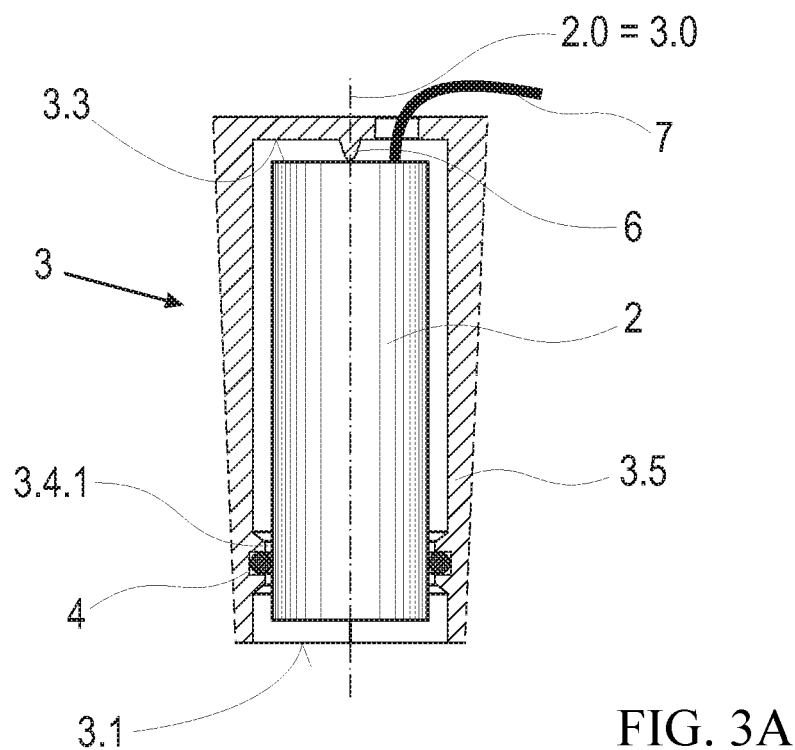
FIG. 3A shows a first embodiment of a sleeve for receiving a sensor.

According to a first exemplary embodiment of the sleeve 3, shown in FIG. 3A, the first collars 3.4.1 each have an end face concentrically enclosing the sleeve axis 3.0, in which end face an annular groove is formed, in which a sealing ring 4 is arranged, which encloses the sensor 2 in a force-fitting manner In this exemplary embodiment, the sleeve wall 3.5 is limited on one side, as an example, by a bottom surface 3.3 and is thus closed on one side except for an opening for a media cable 7 connected to the sensor 2. On the bottom face 3.3 there is shown a central elevation 6, on which the sensor 2 is placed during mounting into the sleeve 3 and is then held centered by the elevation 6 and the sealing ring 4.

Figure 3B:
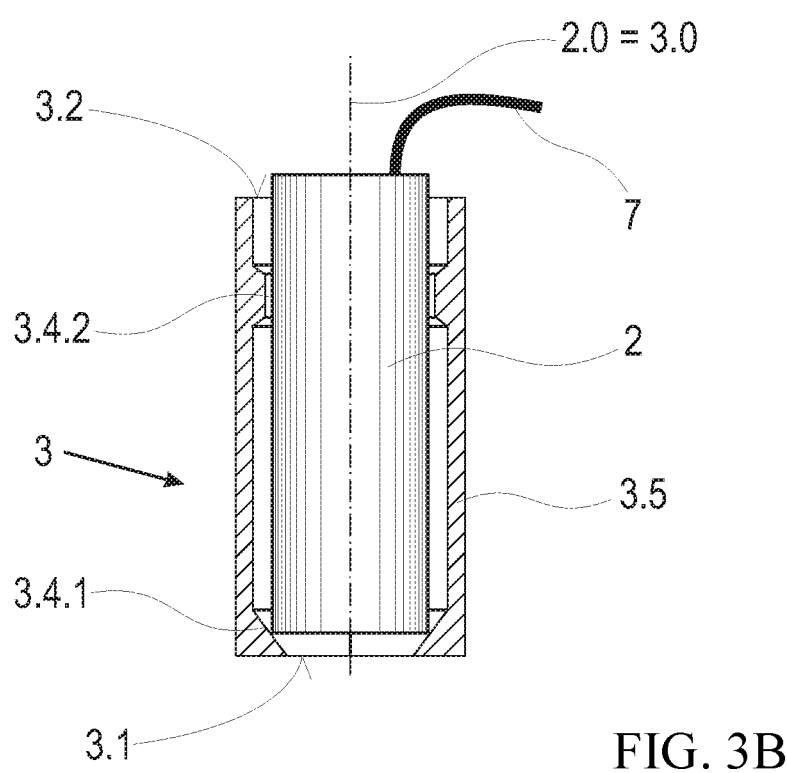
FIG. 3B shows a second embodiment of a sleeve for receiving a sensor.

According to a second exemplary embodiment of a sleeve 3, shown in FIG. 3B, the first collars 3.4.1 each have a conical inner surface facing the second collar 3.4.2, on which the sensor 2 is centered in a force-fitting manner The holding device 1 advantageously is a monolithic component produced in a generative manufacturing process. Additional small parts for fixing the sensors 2 in the sleeves 3, such as a sealing rubber or spring elements 3.4.3, can be inserted in grooves provided for this purpose in the sleeve walls 3.5.

LIST OF REFERENCE NUMERALS

0 workpiece
1 holding device 2 sensor
2.0 sensor axis
3 sleeve
3.0 sleeve axis
3.1 first end face (of the sleeve 3)
3.2 second end face (of the sleeve 3)
3.3 bottom face (of the sleeve 3)
3.4.1 first collar (on the sleeve 3)
3.4.2 second collar (on the sleeve 3)
3.4.3 spring element (on the sleeve 3)
3.5 sleeve wall
4 sealing ring
5 spacer
6 elevation
7 media cable
P point of intersection (of the sleeve axes 3.0)

What is claimed is:

1. A sensor device for scanning laser processing of a workpiece by a laser beam deflected about a pivot point, the device comprising:
   a holding device being formed by a matrix- or honeycomb-shaped arrangement of firmly interconnected sleeves comprised of individual sleeves open on at least one side, each sleeve having a sleeve axis, the sleeve axes intersecting at a point of intersection (P) outside the holding device; and
   at least two sensors, each of the at least two sensors having a sensor axis and being arranged in one of the sleeves such that their sensor axis coincides with the sleeve axis.

2. The sensor device according to claim 1, wherein each sleeve has a sleeve wall which is bounded by a first end face and a second end face or a bottom face, and wherein the point of intersection (P) is located on a side of the first end face of each sleeve.

3. The sensor device according to claim 2, wherein first end faces of each sleeve form a contiguous mating surface which is adapted to a surface contour of the workpiece to be processed in a processing area.

4. The sensor device according to claim 3, wherein at least some of the first end faces are provided with spacers facing away from the holding device and wherein the workpiece to be processed can be applied against the spacers.

5. The sensor device according to claim 1, wherein the sensor device has more sleeves than sensors, wherein the at least two sensors are mutually arranged with respect to one another to form a selectable pattern.

6. The sensor device according to claim 1, wherein a first collar and a second collar are formed in each of the sleeves within which one of the sensors is held.

7. The sensor device according to claim 6, wherein the first collar and the second collar each have a circular inner contour and wherein the sensors have a cylindrical outer contour.

8. The sensor device according to claim 6, wherein each first collar has an end face concentrically enclosing the sleeve axis, wherein an annular groove is formed in the end face and wherein a sealing ring is arranged in the annular groove to enclose one of the sensors in a force-fitting manner.

9. The sensor device according to claim 6, wherein each first collar has a conical inner surface on which one of the sensors is centered in a force-fitting manner.

10. The sensor device according to claim 1, wherein the holding device is a monolithic component.

11. The sensor device according to claim 10, wherein an outer circumferential line of a cross-section of each sleeve has a hexagonal shape and an inner circumferential line of the cross-section of each sleeve has a circular shape.

\* \* \* \* \*